(12) United States Patent
Geoffroy et al.

(10) Patent No.: US 11,888,373 B2
(45) Date of Patent: Jan. 30, 2024

(54) LINEAR MOTOR SYSTEM AND OPERATING METHOD FOR THE SAME

(71) Applicant: Schneider Electric Industries SAS, Rueil-Malmaison (FR)

(72) Inventors: Guillaume Geoffroy, Ettenheim (DE); Frank Klöser, Hohberg (DE); Frank Brechtefeld, Offenburg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 29 days.

(21) Appl. No.: 17/444,912

(22) Filed: Aug. 12, 2021

(65) Prior Publication Data

US 2022/0052595 A1 Feb. 17, 2022

(30) Foreign Application Priority Data

Aug. 14, 2020 (EP) .................................... 20305931

(51) Int. Cl.
| | |
|---|---|
| *H02K 41/03* | (2006.01) |
| *H02K 11/215* | (2016.01) |
| *H02P 25/064* | (2016.01) |
| *H02K 29/08* | (2006.01) |

(52) U.S. Cl.
CPC ......... *H02K 41/031* (2013.01); *H02K 11/215* (2016.01); *H02K 29/08* (2013.01); *H02P 25/064* (2016.02)

(58) Field of Classification Search
CPC ...... H02K 11/21; H02K 11/215; H02K 29/08; H02K 41/031; H02P 25/064
USPC ........ 310/12.01, 12.14, 24, 25, 26, 68 B, 71
See application file for complete search history.

(56) References Cited

U.S. PATENT DOCUMENTS

| | | | | |
|---|---|---|---|---|
| 5,947,361 | A  * | 9/1999 | Berger | .................... B41F 13/03 |
| | | | | 226/110 |
| 8,210,343 | B2 * | 7/2012 | Lykkegaard | ......... H02K 41/031 |
| | | | | 198/805 |
| 11,370,621 | B2 * | 6/2022 | Yamamoto | ............. B65G 54/02 |
| | | | (Continued) | |

FOREIGN PATENT DOCUMENTS

| | | |
|---|---|---|
| DE | 10 2018 118 814 A1 | 2/2020 |
| EP | 3 285 046 A1 | 2/2018 |
| WO | WO 2020/025359 A1 | 2/2020 |

OTHER PUBLICATIONS

Extended European Search Report dated Feb. 1, 2021 in European Patent Application No. 203059315, 8 pages.

*Primary Examiner* — Rashad H Johnson
(74) *Attorney, Agent, or Firm* — Oblon, McClelland, Maier & Neustadt, L.L.P.

(57) ABSTRACT

The invention relates to a linear motor system, in particular a transport system, e.g. a multi-carrier, having a plurality of or for a plurality of carriers, and having a guide track for the carriers, wherein, at the guide track, a first magnetic sensor for determining a magnetic field with respect to a first spatial direction and for outputting a first sensor signal and a second magnetic sensor for determining a magnetic field with respect to a second spatial direction and for outputting a second sensor signal are provided, wherein the control device is configured to determine position information relating to a carrier on the basis of the first sensor signal and to determine identification information relating to a carrier on the basis of the second sensor signal.

27 Claims, 6 Drawing Sheets

(56) References Cited

U.S. PATENT DOCUMENTS

| | | | |
|---|---|---|---|
| 2003/0005851 A1* | 1/2003 | Post | F16C 39/063 104/281 |
| 2012/0090963 A1* | 4/2012 | van de Loecht | H02K 41/031 198/805 |
| 2015/0028699 A1* | 1/2015 | Hofstetter | H02K 41/02 310/12.32 |
| 2019/0047794 A1 | 2/2019 | Ozimek et al. | |
| 2019/0097552 A1 | 3/2019 | Das | |
| 2019/0312533 A1 | 10/2019 | Das | |
| 2020/0052568 A1* | 2/2020 | Yamamoto | H02K 11/21 |
| 2020/0161998 A1 | 5/2020 | Kim et al. | |
| 2020/0166389 A1 | 5/2020 | Huang et al. | |
| 2021/0159834 A1* | 5/2021 | Schönke | H02K 11/215 |

\* cited by examiner

LINEAR MOTOR SYSTEM AND OPERATING METHOD FOR THE SAME

The present invention relates to a linear motor system, in particular a transport system, e.g. a multicarrier, having a plurality of or for a plurality of carriers and having a guide track for the carriers.

Linear motors are widely used today. They can, for example, be used to move products in industrial plants, in particular to transport them. Multi-carriers are particularly advantageous for the flexible transport of the most varied products. They in particular comprise a plurality of carriers, that is transport units, that can be moved individually and independently of one another. In a typical multi-carrier system, the guide track is closed in itself, i.e. it is practically endless, which enables a revolving operation.

In systems having a plurality of carriers, it is necessary or advantageous in many applications to be able to automatically identify the individual carriers. An identification of a carrier may, for example, be desirable when a carrier is added or removed in the shut-down or currentless state of the system. The same applies in the event that a carrier is, for example, moved by hand during the switched-off state. In further application examples, a plurality of carriers have a different design, different equipment, such as different tools, and/or a different load to be transported. In a specific application example, a product is held between two carriers and is moved by them. In this respect, it is likewise desirable to be able to identify the carriers holding the product using simple means.

Furthermore, an identification of the carriers enables a recording of process data for the respective carrier, for instance, a cumulative movement path. This opens up advantageous possibilities of the predictive maintenance.

Against this background, it is a higher-ranking aim of the invention to be able to identify a carrier, in particular based on identification information individually associated with the carrier, in particular an ID.

One known possibility of identifying carriers in linear motor systems is the application of RFID technology. In this respect, an individually different RFID tag is arranged at each carrier. One or more RFID reading devices are arranged at the guide track. A disadvantage of this approach is that a carrier has to be moved to a reading device for its identification. Since only a limited number of reading devices is typically provided, the identification is therefore locally limited to the few reading devices. In addition, since the RFID tag and reading device communicate wirelessly, there is also a susceptibility to interference that typically accompanies this. Furthermore, additional components are necessary for this approach. While RFID tags as such are indeed available at low cost, substantial costs are at least incurred for the reading devices.

A further known approach is to identify the carriers by means of infrared reading devices at the guide track and corresponding tags at the carriers. The disadvantages are similar to those of RFID technology. Furthermore, infrared technology is susceptible to contamination, for example by liquids and dust, so that its use is of limited reliability in difficult operating environments.

Furthermore, an approach is described in US 2019/0047794 A1 in which a respective position magnet is arranged at different carriers, wherein the position magnets of the respective carriers are arranged or designed differently, for instance with respect to the spacing from a row of magnetic sensors arranged at the guide track that form position sensors, with respect to the field strength and/or the polarity of the position magnets. It is disadvantageous here that the number of carriers that can hereby be identified is limited. It is in particular taught that only a first carrier is to be individually identified and further carriers present in the system are subsequently numbered based on their position in dependence on the position of the first carrier. This in particular has the result that no clear identification is possible if a carrier is added, removed or positioned differently, while changing the order, in the switched-off or currentless state of the system. This approach is therefore in particular not easily secure against manipulation in the switched-off state. Furthermore, a change of the position magnet, for instance with respect to the spacing from the magnetic sensor, with respect to the field strength and/or the polarity, also influences the position measurement as such.

It is an object of the invention to overcome the mentioned disadvantages at least in part. It is in particular the object of the invention to be able to individually identify a carrier in a linear motor system of the initially mentioned kind in a particularly simple manner, preferably also for a plurality of carriers and/or in the event of a manipulation of the carriers present in the system in the switched-off or currentless state of the system.

This object is satisfied by a linear motor system in accordance with claim 1.

Said linear motor system comprises, at the guide track, a first magnetic sensor for determining a magnetic field with respect to a first spatial direction and for outputting a first sensor signal, and a second magnetic sensor for determining a magnetic field with respect to a second spatial direction and for outputting a second sensor signal. Such magnetic sensors are frequently anyway present at known linear motor systems, namely as part of a position detection system for determining a position of a carrier with respect to the guide track. Thus, components for identifying the carrier, which are typically anyway used in the linear motor system, can in particular be used within the framework of the invention. A position detection system frequently even comprises a number of 3D magnetic field sensors, wherein at least two dimensions of these sensors can advantageously be used to implement the invention.

In accordance with the invention, the control device is configured to determine position information relating to a carrier on the basis of the first sensor signal. As indicated above, this corresponds to the measure known per se of using a magnetic sensor to determine a position of the carrier, such as takes place in common magnetic position detection systems.

In accordance with the invention, the control device is furthermore configured to determine identification information relating to a carrier on the basis of the second sensor signal.

The position information and the identification information are therefore determined on the basis of different directional components of a magnetic field generated at the carrier. The identification information can therefore in particular be determined on the basis of a spatial direction of the magnetic field on whose basis no position information is determined. The position information and the identification information can be determined substantially independently of one another and mutual interference is particularly low. This enables a particularly varied encoding of the identification information in the magnetic field. Due to the many possible encoding variants, a completely individual identifier, in particular an individual ID, can be assigned, in particular for a large number of carriers.

As will be shown in detail in the further statements, even an information amount of generally any desired size can ultimately be precisely mapped in the second spatial direction or the corresponding magnetic field component, said information amount at most being limited by the geometric dimensions of the carrier. This constitutes a considerable advantage, in particular with respect to the solution of the prior art described above in which the identity of the carrier is encoded in a different arrangement or configuration of the position magnet, for instance at the spacing of the position magnet from the magnetic sensor. For the possible information amount is there considerably limited by the resolution of the magnetic sensor and its tolerances as well as by the geometrical tolerances of the system.

In general, the first spatial direction and the second spatial direction are different. The second spatial direction in particular extends transversely to the first spatial direction. The second spatial direction is particularly preferably at least substantially perpendicular to the first spatial direction. In this embodiment, the mutual interference between the position determination and the identification determination is particularly low. However, other angles are generally also possible, wherein the mutual interference may be greater.

In accordance with an embodiment, a first magnet, in particular a position magnet, and a second magnet, in particular an identification magnet, are arranged at at least one carrier, in particular at a plurality of carriers. The first magnet and the second magnet can in particular be arranged in different orientations at the carrier. Alternatively or additionally, the first magnet and the second magnet can preferably be arranged such that the magnetic field of the first magnet is effective in the first spatial direction at the location of the first magnet sensor and such that the magnetic field of the second magnet is effective in the second spatial direction at the location of the second magnet sensor. These approaches allow information characterized by the magnetic fields, which can be derived in different spatial directions via the magnetic sensors, to be provided in a simple manner. To reduce interference, it may furthermore be advantageous if the first magnet and the second magnet are arranged such that the magnetic field of the first magnet is at least substantially not effective in the second spatial direction at the location of the second magnetic sensor and such that the magnetic field of the second magnet is at least substantially not effective in the first spatial direction at the location of the first magnetic sensor.

The term "orientation" generally refers to an orientation of the physical magnet, namely to its inner magnetization direction or polarity. In accordance with the convention, the magnetic field extends from south to north in the interior of a magnet and from north to south outside the magnet. Consequently, the orientation of a magnet in question here corresponds to its inner south-north direction.

Outside the magnet, the magnetic field in the case of cylindrical magnets is indeed typically rotationally symmetrical with respect to the inner south-north direction, but has a rather complex shape in this respect. If a carrier with a magnet is arranged in the proximity of a magnetic sensor, the outer magnetic field is inter alia effective at the location of the magnetic sensor, i.e. where the measurement takes place. In this respect, the magnetic field has a specific direction at this location. The magnetic sensor is configured to detect the magnetic field with respect to a specific spatial direction. The spatial direction mentioned herein so-to-say forms a measurement direction, with different measurement directions thus being detected in accordance with the invention. The direction of the magnetic field generated by the magnet of the carrier generally does not have to coincide exactly with the measurement direction. In the measurement direction, the magnetic field is, however, detected with a directional component in the measurement direction. Only when the direction of the magnetic field is perpendicular to the measurement direction at the measurement location is there no directional component of the magnetic field in the measurement direction and is the sensor signal of the respective magnetic sensor 0 for the respective spatial direction. In this case, the magnetic field is therefore not effective in the respective spatial direction at the location of the magnetic sensor.

A magnetic sensor typically determines the strength of the magnetic field. Specifically, the field strength, the flux density, and/or a quantity related to one of these quantities is/are typically determined. In addition, the sensor typically determines the information whether the magnetic field is positively or negatively oriented with respect to the spatial direction or the measurement direction. This is specifically e.g. expressed by a corresponding sign of the strength of the magnetic field or of the sensor signal. In general, the strength by magnitude and the sign can be used both individually and jointly for the identification.

The first and/or second magnets arranged at the carrier is/are preferably permanent magnets that can e.g. be cylindrical or cuboidal. The first and/or second magnets can in particular be designed as a bar magnet. It is, however, generally also conceivable to configure the first and/or second magnets as an electromagnet.

The first magnet and the second magnet can in particular be oriented transversely to one another. An embodiment is particularly preferred in which first magnet and the second magnet are oriented at least substantially perpendicular to one another. This allows a particularly low interference between the position determination, on the one hand, and the identification determination, on the other hand. However, other angles are generally also possible, wherein a stronger interference then occurs where possible. However, such an interference can, for example, be compensated by an increased spacing between the first magnet and the second magnet, in particular a spacing in the guidance direction or x direction.

In a further development, provision is made that a third magnetic sensor is provided for determining a magnetic field with respect to a third spatial direction and for outputting a third sensor signal, wherein the control device is configured to also determine the position information on the basis of the third sensor signal. The determination of the position information can hereby be determined particularly precisely. The third spatial direction can in particular be oriented transversely, preferably at least substantially perpendicular, to the first and/or second spatial direction.

The first and/or the third sensor signal from the first or the third magnetic sensor in particular forms/form a position signal. The second sensor signal from the second magnetic sensor in particular forms an identification signal.

In an advantageous example, provision is made that the first, the second, and/or the third magnetic sensor is/are formed by a common sensor unit. The sensor unit in particular forms a 2D or 3D sensor. Such sensor units are available at low cost as such. This example proves to be particularly advantageous in systems that anyway have a number of such sensor units, wherein the sensor units were, however, previously only used for the position determination. A sensor unit therefore measures the two or three directional components of the magnetic field vector present at a measurement location of the sensor unit. In this respect, different components are in particular used for different functions, namely one or two components for the position determination and one component for the identification determination.

In a particularly simple embodiment, the first, the second, and/or the third magnetic sensor is/are configured as Hall sensors. 2D or 3D Hall sensors can above all be advantageously used and are available at low cost.

A plurality of first, second and/or third magnetic sensors or sensor units can preferably be arranged together on a circuit board.

In typical magnetic position detection systems, a plurality of first, second and/or third magnetic sensors are arranged distributed along the guide track. This also proves to be advantageous here. Due to the invention, it is possible to additionally use the anyway present sensor technology of the position detection system for the identification of the carriers. The magnetic sensors are preferably arranged in a row, in particular an equidistant row, of sensors or sensor units along the guide track.

Further embodiments relate to an exemplary coordinate system defined in the following. Since signs also play a role in the coordinate system in places, the coordinate system described in the following is generally regarded as a right-hand system or a right-handed coordinate system. However, naturally, the statements generally correspondingly also apply to a link system. For example, a measurement point of a respective magnetic sensor can be regarded as a coordinate origin.

The guide track in particular defines an x direction that corresponds to a guidance direction of the guide track. A y direction generally extends perpendicular to the x direction and a z direction generally extends perpendicular to both the x direction and the y direction.

The z direction can in particular be defined by a very small spacing between the first, second and/or third magnetic sensor, on the one hand, and the first and/or second magnet, on the other hand. The very small spacing in the operation of the system and on the passing of the carrier at the magnetic sensor is hereby meant. The z direction therefore so-to-say points from the magnetic sensor to the magnets. The y direction thus results in the right-hand system.

The first magnet and the second magnet are preferably oriented at least substantially perpendicular to one another and/or perpendicular to the movement direction of the carrier. In accordance with a preferred embodiment, the first magnet is oriented at least substantially in the negative or positive z direction and/or the second magnet is oriented at least substantially in the negative or positive y direction.

Furthermore, it is advantageous if the first spatial direction is the x direction or the z direction and/or if the second spatial direction is the y direction. The third spatial direction can, for example, be the z direction or the x direction, depending on which direction is the first spatial direction. Thus, it results that the first magnetic sensor in particular detects the Bx component (or the Bz component) of the magnetic field. The second magnetic sensor in particular detects the By component. The third magnetic sensor in particular detects the Bz component (or the Bx component). In this respect, B stands for the flux density at the measurement location in the respective spatial direction x, y, or z.

In accordance with an advantageous further development, provision is made that the first, the second, and/or the third magnetic sensor, in particular the sensor unit, is/are at least substantially arranged in a plane that extends perpendicular to the orientation of the magnet and through a central point of the second magnet. This plane is also designated as the central plane of the respective magnet.

This plane is preferably an xz plane within the framework of the coordinate system described above. An xz plane is generally a plane that is spanned by the x direction and the z direction or is in parallel with the x direction and the z direction.

The central point of the magnet designates the center of the magnet between its poles. In the plane that extends through this central point of the magnet and that is perpendicular to its orientation, that is in the central plane, the magnetic field of the magnet is generally only effective perpendicular to this plane. Within the framework of this further development, the magnetic sensors are therefore to be at least substantially arranged in this plane. Since the magnetic field of the magnet is only effective perpendicular to this plane, in particular only in the y direction, no interference of the magnetic field in the other two spatial directions, and thus no interference of the position determination, takes place. This at least applies to ideal magnetic fields, wherein the advantageous effect can, however, also be exploited in the practical application, that is with real magnets or magnetic fields. Furthermore, this generally above all applies to straight sections of the guide track, but applies with restrictions to curved sections.

In a further embodiment, provision is made that a plurality of second magnets are arranged at the carrier, wherein the second magnets form an identifier of the carrier. The identifier can generally, for example, be implemented by a number and/or arrangement of the plurality of second magnets that identifies the carrier, or also by a magnetization of a different strength of the second magnets. In general, only a first magnet or only a position magnet is preferably provided at a carrier.

The plurality of second magnets can preferably be arranged distributed along the movement direction of the carrier, in particular arranged equidistantly at least within a grouping of second magnets.

An advantageous embodiment example provides that a plurality of second magnets are arranged at the carrier and are each arranged in a specific orientation at the carrier, wherein the specific orientations are associated with specific identification information. Due to an individual composition of orientations, an identifier, in particular an identification number or ID, of a respective carrier can therefore be provided in a simple manner, for example.

The second magnets can in particular be arranged in an orientation different from a first orientation and a second orientation that is in particular opposite the first orientation. Due to only two possible orientations, a binary encoding can, for example, be implemented as an identifier in a simple manner. The first orientation can, for example, be associated with the value 1 and the second orientation can, for example, be associated with the value 0. Thus, a bit sequence of generally any desired length can be implemented in accordance with the number of second magnets.

Insofar as it is mentioned that the orientations are opposite orientations, an inverse orientation in a three-dimensional space is hereby meant. Opposite orientations are therefore generally in parallel with one another, but face in opposite directions. In the comparison of an orientation with its opposite orientation, all the signs of the respective direction components are reversed with respect to a given coordinate system.

At the magnetic sensor, the different orientations of the magnets can, for example, be reflected in measurement values having correspondingly different signs. The opposite orientations are preferably orientations in the positive and negative y directions. As a result, an identification number, in particular a unique identification number, of the carrier can therefore, for example, be encoded in the y polarization of the magnets, that is in the orientation of the magnets with respect to the y direction.

The above-described encoding through different orientations of the second magnets generally enables at least one identification of the carrier during a movement thereof. Said identification in this respect only has to be at most as large as the spacing between two second magnetic sensors adjacent along the guide track.

An embodiment will be described in the following that also enables the identification of at least one of the carriers at a standstill. Accordingly, a first carrier can have a plurality of second magnets. The second magnets of the first carrier and/or a grouping of second magnets of the first carrier are predominantly arranged in a first orientation. Furthermore, a second carrier can have a plurality of second magnets, wherein the second magnets at the second carrier or a grouping of second magnets at the second carrier are not predominantly arranged in the first orientation, but are in particular predominantly arranged in another orientation that is in particular opposite the first orientation. This results in a magnetic sensor, in whose proximity the second magnets of the first carrier are arranged, measuring a relatively high flux density or field strength in accordance with the predominant orientation of the second magnets since the magnetic fields complement one another. The first carrier can hereby also be distinguished from a second carrier at a standstill. At a magnetic sensor, in whose proximity the second magnets of the second carrier are arranged, a similarly high flux density or field strength results in the case of a predominantly opposite orientation, but with the opposite sign. If the second magnets are further, for example, alternately oriented at a carrier, a reinforcing superposition of the magnetic fields of the individual second magnets does not take place, but the magnetic fields largely cancel one another out. This can likewise be measured at a standstill.

In the sense of the embodiments described further above with a binary encoding through different magnet orientations, in the embodiment described here with predominantly differently oriented magnets, many magnets are therefore arranged in orientation 1 at the first carrier and many magnets are arranged in orientation 0 at the second carrier.

The predominantly different orientation of the magnets therefore makes it possible to also differentiate between the first carrier and the second carrier in a simple manner at a standstill. This further enables a faster starting process of the linear motor system since at least one carrier can still be recognized at a standstill. The linear motor system can therefore be configured to identify at least one carrier during the standstill of this carrier. As described, an identification is, however, also possible during the movement of the carrier, in particular in the x direction.

For example, all the second magnets can be arranged in orientation 1 at the first carrier, e.g. in the form 1111 1111 in the case of 8 bits. At all further carriers, the second magnets can predominantly be arranged in orientation 0, e.g. 0000 0000, 0000 0001, 0000 0010, . . . , 1000 0000. In this case, the direction-dependent field strength that is measured at the first carrier is significantly different than at the further carriers. The first carrier can hereby be identified without moving it.

Alternatively or additionally, an identification during the standstill of the carrier would, for example, also be possible if the sensors and the second magnets are at least substantially equally spaced apart from one another in the guidance direction or x direction. This at least applies in the case that the sensors and the second magnets are at least substantially arranged in a coinciding manner in the guidance direction or the x direction, i.e. are in particular arranged disposed opposite one another in the z direction.

In general, the linear motor system preferably comprises a guide track having a plurality of electromagnets arranged distributed along the guide track; at least one carrier that is guided by and movable along the guide track and that comprises a drive magnet for cooperating with the electromagnets of the guide track to move the carrier; and a control device for controlling the movement of the carrier relative to the guide track by a corresponding control of the electromagnets.

The carrier(s) can preferably be mechanically guided at the guide track, in particular by a roller guide.

Furthermore, the control device of a linear motor system is typically configured to regulate the movement of the carrier, in particular on the basis of feedback information such as position information. This allows a precise movement of the carrier along the guide track. For example, a speed regulation, a position regulation, an acceleration regulation, a current regulation, and/or a force regulation can be provided. The feedback information can e.g. be the position information based on the first and/or third sensor signal. Insofar as the control device is configured to regulate the movement of the carrier, this regulation therefore generally relates to the longitudinal direction of the guide track. With respect thereto, for instance, the position, the speed and/or the acceleration of the carrier, and/or the force exerted by the electromagnets on the carrier can be regulated.

The object is further satisfied by a carrier in accordance with the independent claim directed thereto, namely a carrier for a linear motor system, in particular for a transport system, e.g. a multicarrier, in particular for a linear motor system of the kind described above, wherein the carrier has at least a first magnet, in particular a position magnet, and at least a second magnet, in particular an identification magnet, and wherein the second magnet is oriented transversely, in particular at least substantially perpendicular, to the first magnet.

The first magnet and the second magnet can preferably be oriented transversely, in particular at least substantially perpendicular, to the guidance direction or the movement direction of the carrier.

The object of the invention is also satisfied by a method in accordance with the independent claim directed thereto, namely a method of operating a linear motor system, in particular a transport system, e.g. a multicarrier, in particular a linear motor system of the kind described above, wherein the linear motor system comprises a plurality of carriers and a guide track for the carriers, wherein the method comprises: determining a magnetic field with respect to a first spatial direction by means of a first magnetic sensor arranged at the guide track; determining a magnetic field with respect to a second spatial direction by means of a second magnetic sensor arranged at the guide track; determining position information relating to a carrier on the basis of the magnetic field with respect to the first spatial direction; and determining identification information relating to a carrier on the basis of the magnetic field with respect to the second spatial direction.

It is understood that the methods described herein can also be further developed in the sense of the individual features and embodiments described with respect to the apparatus, that is in particular the linear motor system, the transport system and/or the carrier. This also applies in reverse and between different methods and apparatus.

The invention will be explained only by way of example in the following with reference to the schematic drawings.

Figure 1:
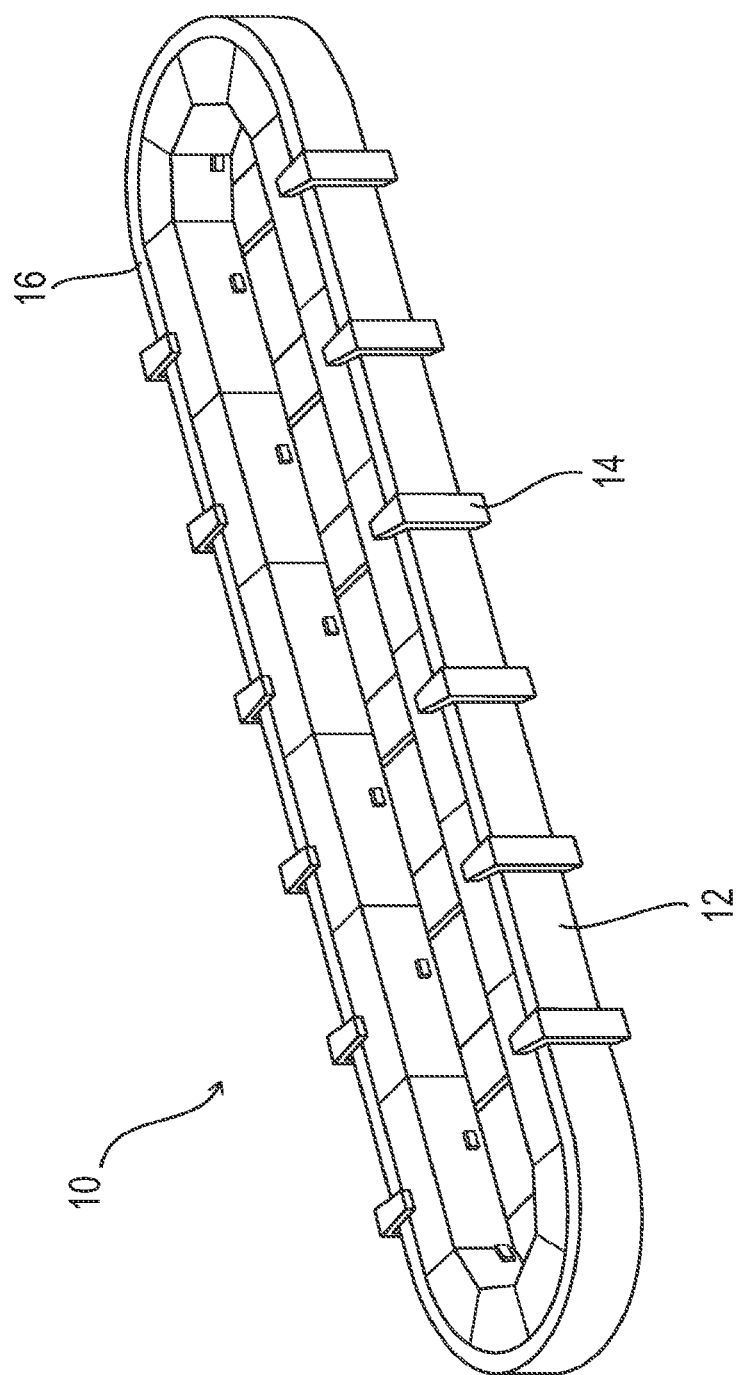
FIG. 1 shows a linear motor system configured as a transport system.

A transport system 10 in accordance with the invention, which is configured as a multi-carrier system, is shown in FIG. 1. The transport system 10 comprises a plurality of linear motors 12 that are arranged in rows such that a continuous and in this case revolving movement of the carriers 14 along a guide track 16 is made possible. The transport system 10 further comprises a plurality of carriers 14 that form individual transport elements of the transport system 10 and that can be moved along the guide track 16, in particular independently of one another, by means of the linear motors 12.

Figure 2:
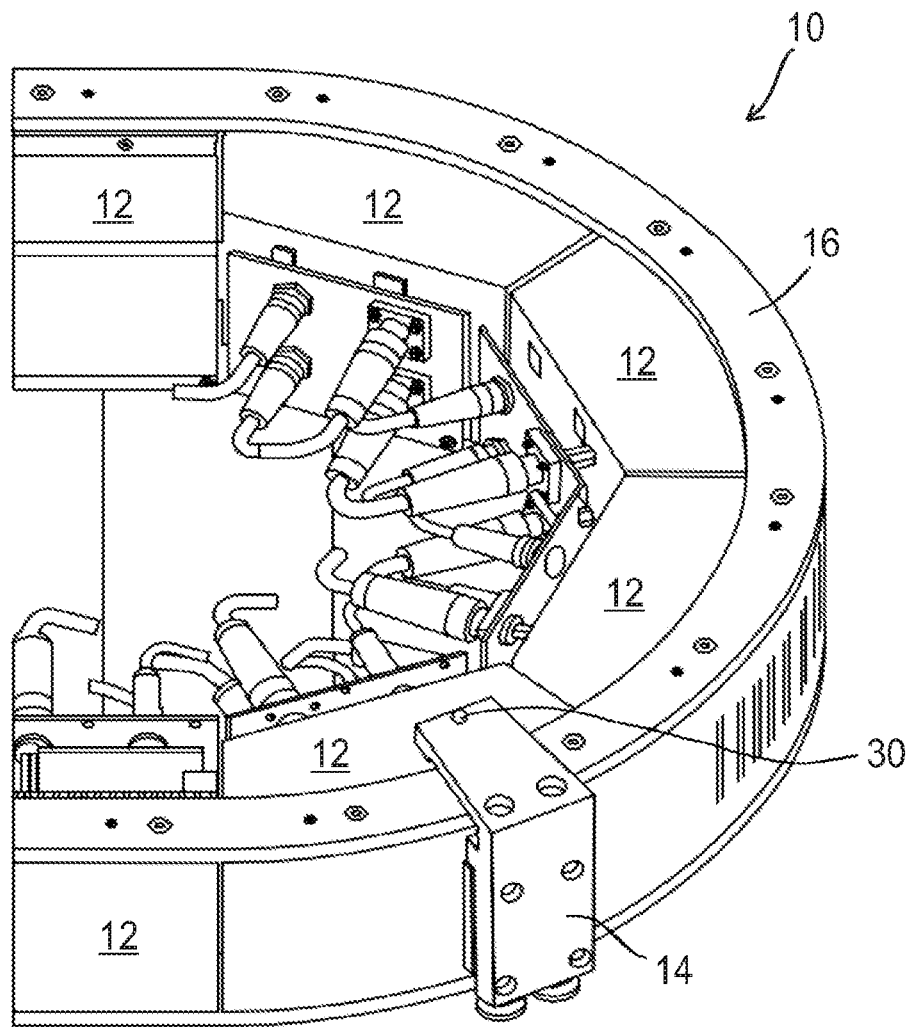
FIG. 2 shows a curve section of the transport system of FIG. 1.

FIG. 2 shows a curve section of the transport system 10 in an enlarged view. Only one carrier 14 is shown here that is movable along the guide track 16, namely via the linear motors 12. Different electronic devices for controlling the linear motors 12 are visible at the side of the guide track 16 remote from the carrier 14, that is within the curve.

Figure 3:
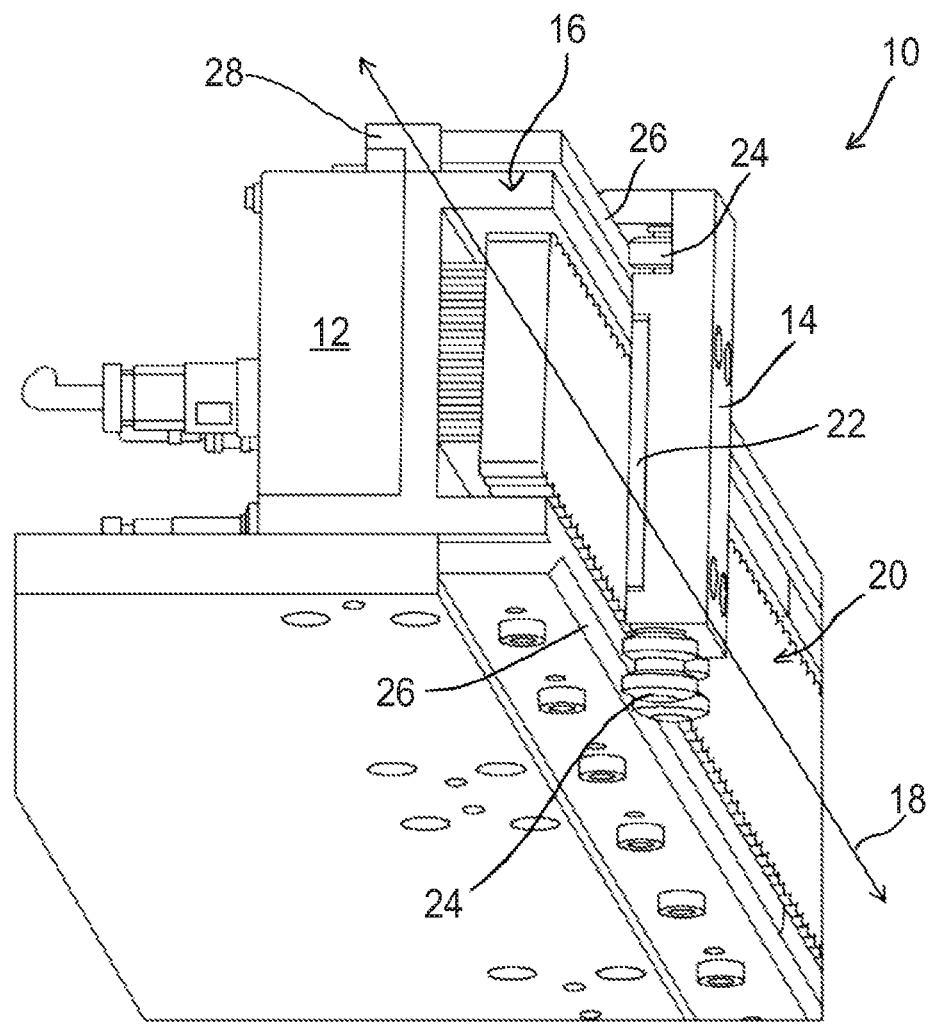
FIG. 3 shows a cross-section of the transport system of FIG. 1 with the sectional plane perpendicular to a guide track.

In FIG. 3, the transport system 10 is shown in a sectional view and enlarged. A carrier 14 is visible that is movably guided at the guide track 16. In this respect, the carrier 14 is movable along a guide axis 18 or a movement axis. For a movement along the guide axis 18, the carrier 14 is controlled by a plurality of electromagnets 20 that are arranged at the guide track 16 and that are uniformly distributed along it. The electromagnets 20 in this respect cooperate with a permanent magnet 22, which is arranged at the carrier 14 and which can also be designated as a drive magnet, for driving the carrier.

The carrier 14 is mechanically guided at the guide track 16, namely by a roller guide. Said roller guide comprises guide rollers 24 at the carrier 14 and guide rails 26 at the guide track 16. The carrier 14 is in this respect held at the guide track 16, in particular via the permanent magnet 22.

The transport system 10 furthermore comprises a position detection device 28. It can, for example, be formed as a series of a plurality of magnetic sensors that extends along the guide track 16. For example, a permanent magnet 30, which can also be designated as a position magnet and is visible in FIG. 2, can be provided at the carrier 14.

The transport system 10 furthermore comprises a control device that is not shown separately and that is configured to control the electromagnets 20 in a targeted manner in order to move the carrier 14 along the guide track 16 or the guide axis 18. In this respect, the position detection device 28 returns position information relating to the position of the carrier 14 with respect to the guide axis 18 to the control device. The control device regulates the movement of the carrier 14 on the basis of the position information.

Figure 4:
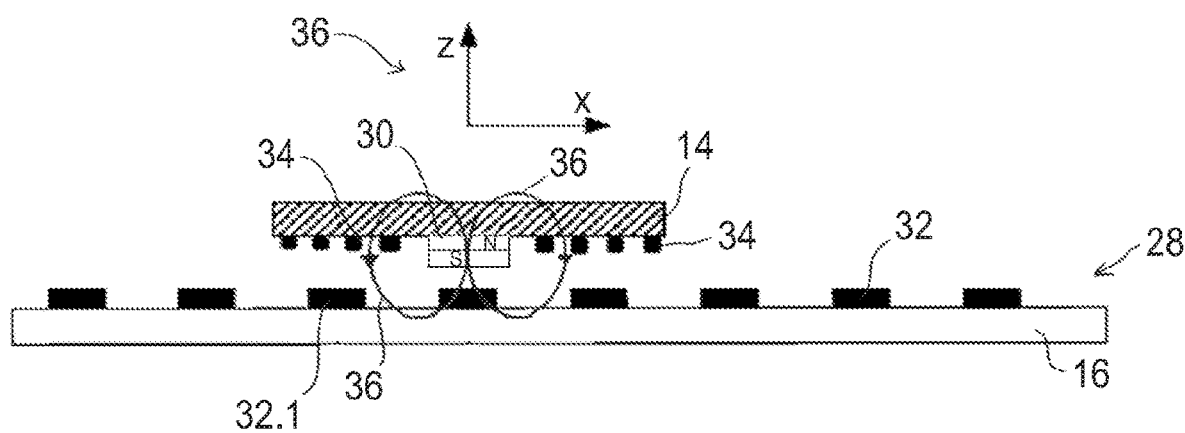
FIG. 4 shows a simplified diagram of a carrier with different magnets with respect to a guide track with different magnetic sensors.

In FIG. 4, a position detection device 28 is shown that has a plurality of magnetic sensor units 32 arranged at the guide track 16. A respective magnetic sensor unit 32 is configured as a 3D Hall sensor. A respective magnetic sensor unit 32 comprises three magnetic sensors that measure independently in the three spatial directions and that have a common measurement point.

A carrier 14, which is guided and movable along the guide track 16, comprises a position magnet 30 and a plurality of identification magnets 34, namely eight identification magnets 34 in the embodiment shown.

In addition, a coordinate system 36 is indicated. The guidance direction of the guide track 16 corresponds to the x direction. The z direction is perpendicular to the x direction and points from a respective magnetic sensor unit 32 to the magnets 30, 34. The z direction is therefore defined by the spacing of the magnetic sensor unit 32 from the respective magnet 30, 34. A y direction extends perpendicular to the image plane, and indeed into the image plane in a right-hand system.

The position magnet 30 is oriented in the z direction, which is inter alia indicated by the fact that a transverse line, which indicates a central plane, is drawn in at the position magnet 30. Furthermore, field lines 36 of the position magnet 30 are indicated that extend outside the magnet from the north pole to the south pole. The sign of the orientation of the position magnet 30 with respect to the z direction is positive here, but can alternatively, for example, also be negative; the magnet 30 could therefore also be oppositely oriented.

The magnetic sensor units 32 are connected to a control device and each transmit three sensor signals that correspond to the components Bx, By, Bz of the magnetic field present at the measurement location in the three spatial directions x, y, and z. Two of these spatial directions or sensor signals are evaluated by the control device to determine the position information. They are in particular the components Bx and Bz or the sensor signal that represents the magnetic field with respect to the x direction and the sensor signal that represents the magnetic field with respect to the z direction.

The position magnet 30 is arranged centrally to the oppositely disposed magnetic sensor unit 32 with respect to the y direction. This means that the y component of the magnetic field or By of the position magnet 30 at the location of the magnetic sensor unit 32 is substantially always 0. Therefore, identification information can be advantageously encoded in the y dimension without the position determination and the identification determination interfering with one another.

Accordingly, the identification magnets 34 are oriented—either positively or negatively—in the y direction, that is their south-north direction extends perpendicular to the image plane and either into or out of it. Therefore, the observer of FIG. 4 so-to-say looks at the south pole end or north pole end of a respective identification magnet 34.

Figure 5:
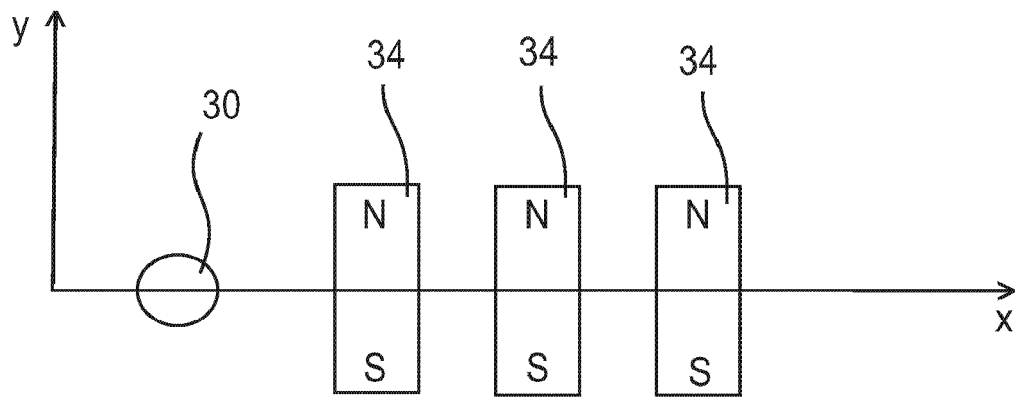
FIGS. 5 and 6 illustrate the spatial arrangement of position and identification magnets.

The spatial orientation of the magnets 30 and 34 at the carrier 14 is illustrated in more detail in FIG. 5. Spatial directions y and x are indicated. The direction of view of the observer in FIG. 5 substantially corresponds to an observation of the arrangement in FIG. 4 from above. The z direction accordingly extends perpendicular to the image plane and out of it in the right-hand system.

The identification magnets 34 are oriented in the y direction, and indeed all positively in FIG. 5. Individual identification magnets 34 can also be oriented reversely, that is negatively in the y direction, wherein unique identifiers for the carriers can be formed by individual compositions of such orientations at different carriers. This will be explained in more detail in the following with reference to FIGS. 7 to 9.

The position magnet 30 is oriented in the z direction and is in this respect arranged centrally with respect to the z direction and centrally with respect to the identification magnets 34. The position magnet 30 is further oriented perpendicular to the identification magnets 34.

Figure 6:
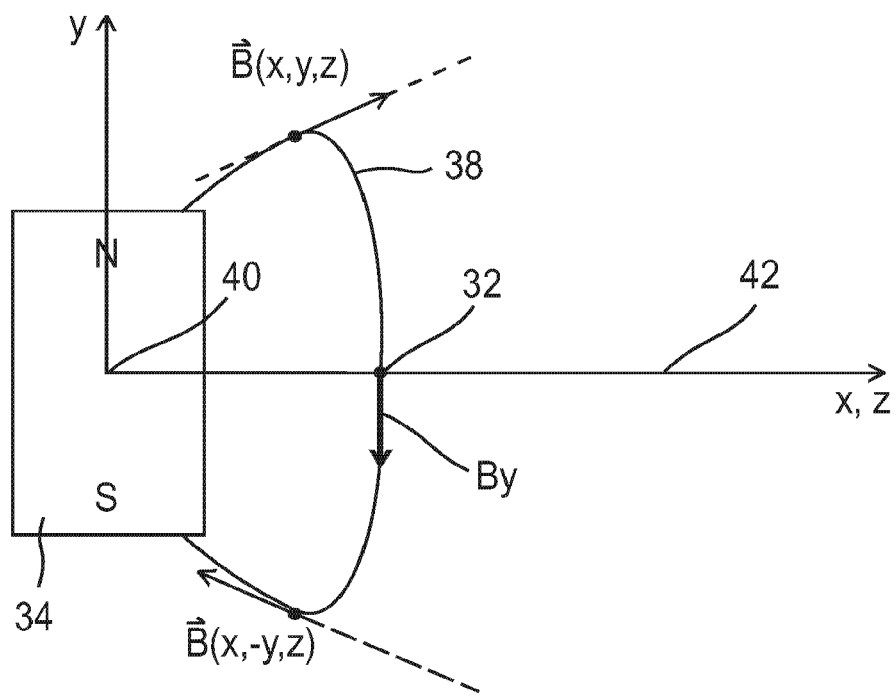

The course of the magnetic field 38 of an identification magnet 34 is illustrated in FIG. 6. The field is generally rotationally symmetrical with respect to a central axis of the identification magnet 34, which coincides with the y axis, or with respect to the orientation of the magnet that is in parallel with the y axis. For this reason, the representation applies to all the planes that include the y axis. Accordingly, the x direction and the z direction are marked at the axis directed to the right. The field is further symmetrical with respect to the xz plane.

The magnetic field 38 generally has components in the x, y, and z directions at each location. This is in particular illustrated by the vectors B indicated in FIG. 6. Depending on which point in space is considered, the components are different—in some places also 0—and may have different signs.

The components in the x and z directions are always substantially in a plane that is perpendicular to the y direction, that extends through a central point 40 of the identification magnet 34, and that is also designated as the central plane 42. This central plane 42 is the xz plane here. The y component, in contrast, is not 0—at least at a sufficiently small spacing from the identification magnet 34—and is indicated by the vector By in FIG. 6. The magnitude of the vector By or the field strength and/or flux density by magnitude in the central plane 42 inter alia depends on the spacing of the considered point from the identification magnet 34. The sign depends on the orientation of the identification magnet 34.

It follows from the foregoing that it is particularly advantageous if the magnetic sensor unit 32 or a measurement point is at least substantially arranged in the central plane 42 of the identification magnet or magnets 34, as indicated by the corresponding reference numeral in FIG. 6. The identification magnet 34 therefore only has an influence on the magnetic sensor unit 32 in the y direction. The position magnet only has an influence on the magnetic sensor unit 32 in the x and z directions. The magnetic field measurement with respect to the y direction forms the basis for the determination of the identification information. The determination of the position information takes place with respect to the other two spatial directions, namely with respect to the x and z directions, and indeed in particular at one and the same measurement point for all three spatial directions. Thus, the magnetic field of the identification magnet 34—at least in straight path sections—does not negatively affect the determination of the position information. Conversely, the magnetic field of the position magnet 30 does not negatively affect the determination of the identification information, which has already been indicated above with respect to FIG. 5.

Figure 7:
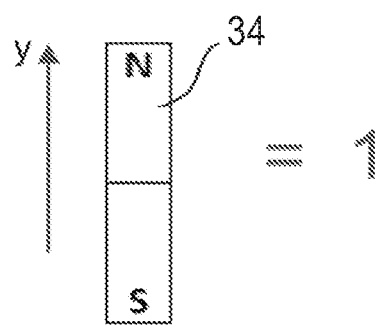
FIGS. 7 to 9 illustrate an encoding of identification information by different orientations of the identification magnets.
Figure 8:
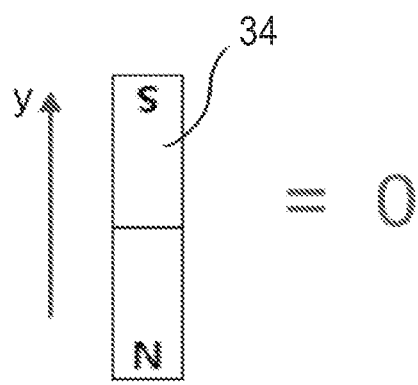
Figure 9:
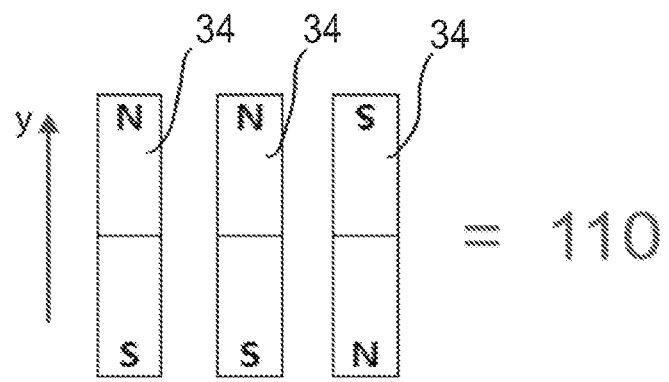

An exemplary possibility of encoding identification information relating to a carrier 14 through different orientations of the identification magnets 34 is illustrated in more detail in FIGS. 7 to 9. For example, it can be specified that an orientation of an identification magnet 34 in the positive y direction, which is indicated in FIGS. 7 to 9 in each case, is evaluated as identification information having the value 1.

This is illustrated in FIG. 7. The orientation of the identification magnet 34, that is its south-north direction, extends in the positive y direction here and represents the value 1. The reverse case is illustrated in FIG. 8. Here, the orientation of the identification magnet 34, that is its south-north direction, is negative with respect to the y direction and represents the value 0. Due to a plurality of identification magnets 34 with individual orientations, identification information can be encoded with a bit depth corresponding to the number of identification magnets 34. In FIG. 9, this is illustrated with three identification magnets 34 of which the first two are positively oriented with respect to the y direction and represent the value 1, wherein the third identification magnet 34 is negatively oriented with respect to the y direction and represents the value 0. The identification information 110 can hereby be encoded. Eight carriers can thus be individually identified. In general, within the framework of this approach, a total of up to $2^n$ carriers can be individually identified using n identification magnets 34 per carrier 14.

Against this background, FIG. 4 is now considered again. Here, the carrier 14 has eight identification magnets 34 that are arranged in a grouped manner, namely before and after the position magnet 30 in a respective one group to the left and to the right or in the x direction. The identification magnets 34 are each oriented either positively or negatively with respect to the y direction and thus form an identifier of the carrier 14. Said identifier can generally be read during a movement of the carrier in the x direction, wherein the movement for the identification should be approximately as long as two adjacent magnetic sensor units 32 are spaced apart with their measurement points with respect to the x direction. The magnetic sensor units 32 or the measurement points can, for example, have a mutual spacing in the range from 1 to 3 cm.

An embodiment that also allows an identification of at least one carrier 14 at a standstill will be described in the following. The grouping of four identification magnets 34 to the left of the position magnet 30 or above the individually referenced magnetic sensor unit 32.1 is considered for this purpose. In this grouping, the identification magnets 34 are predominantly, in particular all, arranged in a first orientation, for example, the orientation 1. This has the result that, during a standstill of the carrier 14, a very strong magnetic field is measured at the position shown here with respect to the y direction with a corresponding sign depending on the orientation of the identification magnets 34 by means of the magnetic sensor unit 32.1. If a second carrier 14 in the corresponding grouping has identification magnets 34 that are only or predominantly oppositely oriented, i.e. arranged in orientation 0, a very strong magnetic field, but with an opposite sign, is likewise measured at a magnetic sensor 32 arranged in the proximity of this grouping. The first and second carriers can hereby be differentiated from one another. The same correspondingly also applies to the grouping of identification magnets 34 to the right of the position magnet 30 and/or to all the identification magnets 34 of the carrier 14 together.

The approach described above can advantageously be used to uniquely identify a single (first) carrier 14 in a plurality of carriers present in the system. Thus, at the first carrier 14, the identification magnets 34 can, for example, encode a carrier ID that reads 1111 1111. For all other carriers, the identification magnets 34 can predominantly be oppositely oriented, that is encode carrier IDs that predominantly comprise 0 values, for example 0000 0000, 0000

0001, 0000 0010, . . . , 1000 0000. In this system, the first carrier 14 can already be identified when stationary.

In summary, the invention therefore enables the use of 3D magnetic sensors, which are typically present at a linear motor system, for identifying the individual carriers. The carriers in particular have a number of identification magnets whose polarities encode a unique identification number of the respective carrier. In this respect, magnetic field components in different spatial directions can be used for the position determination, on the one hand, and for the identification determination, on the other hand, so that at least substantially no interference results between the position determination and the identification determination.

Specific cost advantages result by using the anyway present position sensors for the identification. The identification of at least one carrier is possible even without movement. Since unique IDs can be assigned to the carriers, a predictive maintenance can in particular be implemented in that the use of the carrier, for example its total movement path covered so far, can be recorded. Finally, the unique identification of the carriers is in particular also reliably provided in the case of a temporary shutdown of the system.

REFERENCE NUMERAL LIST

10 transport system
12 linear motor
14 carrier
16 guide track
18 guide axis
20 electromagnets
22 drive magnet
24 guide rollers
26 guide rail
28 position detection device
30 position magnet
32 magnetic sensor unit
34 identification magnets
36 magnetic field/field lines
38 magnetic field/field lines
40 central point
42 central plane

The invention claimed is:

1. A linear motor system, the linear motor system having a plurality of carriers or being configured for a plurality of carriers, comprising:
    a guide track for the carriers, and
    a control device,
    wherein a first magnetic sensor for determining a magnetic field with respect to a first spatial direction and for outputting a first sensor signal and a second magnetic sensor for determining a magnetic field with respect to a second spatial direction and for outputting a second sensor signal are provided at the guide track,
    wherein the control device is configured
    to determine position information relating to a carrier on the basis of the first sensor signal, and
    to determine identification information relating to a carrier on the basis of the second sensor signal, and
    wherein the identification information is determined based on a spatial direction of the magnetic field on whose basis no position information is determined.

2. The linear motor system in accordance with claim 1, wherein
    a first magnet is arranged one of:
        at least one carrier in a first orientation, and
        such that a magnetic field of the first magnet is effective in the first spatial direction at a location of the first magnet sensor, and
    a second magnet is arranged one of:
        at the carrier in a second orientation, and
        such that a magnetic field of the second magnet is effective in the second spatial direction at a location of the second magnetic sensor.

3. The linear motor system in accordance with claim 2, wherein the first magnet is a position magnet.

4. The linear motor system in accordance with claim 2, wherein the first magnet is an identification magnet.

5. The linear motor system in accordance with claim 2, wherein the first magnet and the second magnet are oriented transversely to one another.

6. The linear motor system in accordance with claim 5, wherein the first magnet and the second magnet are oriented at least substantially perpendicular to one another.

7. The linear motor system in accordance with claim 1, wherein a third magnetic sensor is provided for determining a magnetic field with respect to a third spatial direction and for outputting a third sensor signal, wherein the control device is configured to also determine the position information on the basis of the third sensor signal.

8. The linear motor system in accordance with claim 7, wherein at least one of:
    at least one of the first magnetic sensor, the second magnetic sensor, and the third magnetic sensor is/are formed by a common sensor unit, and
    at least one of the first magnetic sensor, the second magnetic sensor, and the third magnetic sensor is/are a Hall sensor.

9. The linear motor system in accordance with claim 7, wherein at least one a plurality of first, a plurality of second and a plurality of third magnetic sensors are arranged distributed along the guide track.

10. The linear motor system in accordance with claim 1, wherein at least one of:
    at least one of the first magnetic sensor and the second magnetic sensor is formed by a common sensor unit, and
    at least one of the first magnetic sensor and the second magnetic sensor is a Hall sensor.

11. The linear motor system in accordance with claim 1, wherein at least one of a plurality of first and a plurality of second magnetic sensors are arranged distributed along the guide track.

12. The linear motor system in accordance with claim 1, wherein the guide track defines an x direction that corresponds to a guidance direction of the guide track, wherein a y direction extends perpendicular to the x direction, and wherein a z direction extends perpendicular to both the x direction and the y direction.

13. The linear motor system in accordance with claim 12, wherein at least one of the first magnet is oriented at least substantially in the z direction, and the second magnet is oriented at least substantially in the y direction.

14. The linear motor system in accordance with claim 12, wherein at least one of:
the first spatial direction is the x direction or the z direction, and
the second spatial direction is the y direction.

15. The linear motor system in accordance with claim 1, wherein at least one of the first magnetic sensor and the second magnetic sensor is/are at least substantially arranged in a plane that extends perpendicular to an orientation of the second magnet and through a central point of the second magnet.

16. The linear motor system in accordance with claim 15, wherein at least one of the first magnetic sensor and the second magnetic sensor is/are at least substantially arranged in an xz plane.

17. The linear motor system in accordance with claim 15, wherein a third magnetic sensor is provided for determining a magnetic field with respect to a third spatial direction and for outputting a third sensor signal, wherein the control device is configured to also determine the position information on the basis of the third sensor signal, and
wherein at least one of the first, second, and third magnetic sensors is/are at least substantially arranged in a plane that extends perpendicular to the orientation of the second magnet and through a central point of the second magnet.

18. The linear motor system in accordance with claim 17, wherein at least one of the first, the second, and the third magnetic sensor, is/are at least substantially arranged in an xz plane.

19. The linear motor system in accordance with claim 1, wherein a plurality of second magnets are arranged at the carrier, wherein the second magnets form an identifier of the carrier.

20. The linear motor system in accordance with claim 1, wherein a plurality of second magnets are arranged at the carrier and are each arranged in a specific orientation at the carrier, and wherein the specific orientations are associated with specific identification information.

21. The linear motor system in accordance with claim 20, wherein the plurality of second magnets are each arranged in one of a first orientation and a second orientation opposite the first orientation at the carrier.

22. The linear motor system in accordance with claim 1, wherein a first carrier has a plurality of first magnets, wherein at least one of the first magnets of the first carrier and a grouping of first magnets of the first carrier are predominantly arranged in a first orientation.

23. The linear motor system in accordance with claim 22, wherein at least one of a second carrier and a plurality of further carriers has/have a plurality of second magnets, wherein the second magnets at the second or a further carrier or a grouping of second magnets at the second or further carrier are not predominantly arranged in the first orientation.

24. The linear motor system in accordance with claim 23, wherein the second magnets at the second or further carrier or a grouping of second magnets at the second or further carrier are not predominantly arranged in the first orientation, but are arranged in another orientation.

25. The linear motor system in accordance with claim 24, wherein the second magnets at the second or further carrier or a grouping of second magnets at the second or further carrier are not predominantly arranged in the first orientation, but are arranged in another orientation that is opposite the first orientation.

26. A carrier fir a linear motor system,
wherein the carrier has at least a position magnet and at least an identification magnet, and
wherein the identification magnet is oriented transversely to the position magnet.

27. A method of operating a linear motor system,
wherein the linear motor system comprises a plurality of carriers and a guide track for the carriers,
wherein the method comprises:
determining a magnetic field with respect to a first spatial direction using a first magnetic sensor arranged at the guide track;
determining a magnetic field with respect to a second spatial direction using a second magnetic sensor arranged at the guide track;
determining position information relating to a carrier on a basis of the magnetic field with respect to the first spatial direction;
determining identification information relating to a carrier on a basis of the magnetic field with respect to the second spatial direction; and
determining the identification information based on a spatial direction of the magnetic field on whose basis no position information is determined.

* * * * *